United States Patent
Bigman

(10) Patent No.: US 10,585,856 B1
(45) Date of Patent: Mar. 10, 2020

(54) UTILIZING DATA ACCESS PATTERNS TO DETERMINE COMPRESSION BLOCK SIZE IN DATA STORAGE SYSTEMS

(71) Applicant: EMC Corporation, Hopkinton, MA (US)

(72) Inventor: Ron Bigman, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 487 days.

(21) Appl. No.: 15/195,258

(22) Filed: Jun. 28, 2016

(51) Int. Cl.
*G06F 16/174* (2019.01)
*G06F 3/06* (2006.01)
*G06F 16/25* (2019.01)

(52) U.S. Cl.
CPC ........ *G06F 16/1744* (2019.01); *G06F 3/0604* (2013.01); *G06F 3/064* (2013.01); *G06F 3/0631* (2013.01); *G06F 3/0653* (2013.01); *G06F 3/0673* (2013.01); *G06F 16/252* (2019.01)

(58) Field of Classification Search
CPC .... G06F 17/30017; G06F 3/0661; G06F 1/24; G06F 16/1744
See application file for complete search history.

(56) References Cited

U.S. PATENT DOCUMENTS

| | | | | |
|---|---|---|---|---|
| 2011/0218970 | A1* | 9/2011 | Amit | G06F 16/00 707/679 |
| 2013/0275396 | A1* | 10/2013 | Condict | H03M 7/30 707/693 |
| 2014/0149605 | A1* | 5/2014 | Annamalaisami | H04L 41/00 709/247 |
| 2015/0149739 | A1* | 5/2015 | Seo | G06F 3/0608 711/162 |
| 2015/0227540 | A1* | 8/2015 | Lin | G06F 16/1744 707/693 |
| 2015/0234852 | A1* | 8/2015 | Amit | G06F 16/1744 707/693 |
| 2015/0293700 | A1* | 10/2015 | Sasaki | G06F 3/061 711/113 |

(Continued)

OTHER PUBLICATIONS

H.K. Reghbati, "An Overview of Data Compression Techniques," IEEE, Apr. 1981, pp. 71-75.

(Continued)

*Primary Examiner* — Mariela Reyes
*Assistant Examiner* — Courtney Harmon
(74) *Attorney, Agent, or Firm* — BainwoodHuang

(57) ABSTRACT

Techniques for performing data compression in which host application data access patterns are used to determine a compression block size, which is the size of the blocks of data to which compression is applied by a data storage system. A compression block size may be set to the size of the typical data access performed by a host application on the storage data object. The performance resulting from using multiple compression block sizes may be calculated using a detected data access pattern, and the compression block size set to the size of the typical data access pattern performed by the host application in response to the performance resulting from using a compression block size equal to the typical data access performed by the host application on the storage data object exceeding the performance resulting from using the other compression block sizes.

18 Claims, 4 Drawing Sheets

---

CALCULATE I) THE PERFORMANCE RESULTING FROM USING A COMPRESSION BLOCK SIZE EQUAL TO THE SIZE OF THE TYPICAL DATA ACCESS PERFORMED BY THE HOST APPLICATION ON THE STORAGE DATA OBJECT, II) THE PERFORMANCE RESULTING FROM USING A COMPRESSION BLOCK SIZE EQUAL TO A FRACTION (E.G. ½) OF THE TYPICAL DATA ACCESS PERFORMED BY THE HOST APPLICATION ON THE STORAGE DATA OBJECT, AND III) THE PERFORMANCE RESULTING FROM USING A COMPRESSION BLOCK SIZE EQUAL A DEFAULT COMPRESSION BLOCK SIZE     300

↓

COMPARE I) THE PERFORMANCE RESULTING FROM USING A COMPRESSION BLOCK SIZE EQUAL TO THE SIZE OF THE TYPICAL DATA ACCESS PERFORMED BY THE HOST APPLICATION ON THE STORAGE DATA OBJECT, II) THE PERFORMANCE RESULTING FROM USING A COMPRESSION BLOCK SIZE EQUAL TO A FRACTION (E.G. ½) OF THE TYPICAL DATA ACCESS PERFORMED BY THE HOST APPLICATION ON THE STORAGE DATA OBJECT, AND III) THE PERFORMANCE RESULTING FROM USING A COMPRESSION BLOCK SIZE EQUAL A DEFAULT COMPRESSION BLOCK SIZE     302

↓

SET THE COMPRESSION BLOCK SIZE FOR THE STORAGE DATA OBJECT TO THE COMPRESSION BLOCK SIZE RESULTING IN THE BEST PERFORMANCE IN VIEW OF THE DATA ACCESS PATTERN, E.G. SET THE COMPRESSIONG BLOCK SIZE FOR THE STORAGE OBJECT TO THE SIZE OF THE TYPICAL DATA ACCESS PERFORMED ON THE STORAGE DATA OBJECT BY THE CORRESPONDING APPLICATION IN RESPONSE TO THE PERFORMANCE RESULTING FROM COMPRESSING RECEIVED HOST DATA DIRECTED TO THE STORAGE DATA OBJECT USING A COMPRESSION BLOCK SIZE EQUAL TO THE SIZE OF THE TYPICAL DATA ACCESS PERFORMED ON THE STORAGE DATA OBJECT BY THE CORRESPONDING APPLICATION EXCEEDING THE PERFORMANCE RESULTING FROM COMPRESSING RECEIVED HOST DATA DIRECTED TO THE STORAGE DATA OBJECT USING THE OTHER COMPRESSION BLOCK SIZE(S)     304

(56) References Cited

U.S. PATENT DOCUMENTS

| | | | |
|---|---|---|---|
| 2016/0042006 A1* | 2/2016 | Singh | G06F 16/1744 |
| | | | 707/693 |
| 2017/0046074 A1* | 2/2017 | Wang | G06F 3/0608 |
| 2017/0235503 A1* | 8/2017 | Karr | G06F 3/0619 |
| | | | 711/114 |
| 2017/0235774 A1* | 8/2017 | Colgrove | G06F 3/0608 |
| | | | 707/693 |
| 2017/0345122 A1* | 11/2017 | Seiler | G06F 3/0611 |

OTHER PUBLICATIONS

Terry A. Welch, "A Technique for High-Performance Data Compression," IEEE, Jun. 1984, pp. 8-19.

\* cited by examiner

UTILIZING DATA ACCESS PATTERNS TO DETERMINE COMPRESSION BLOCK SIZE IN DATA STORAGE SYSTEMS

BACKGROUND

Data storage systems are arrangements of hardware and software that typically include multiple storage processors coupled to arrays of non-volatile storage devices, such as magnetic disk drives, electronic flash drives, and/or optical drives. The storage processors service storage requests that arrive from host machines. The received requests specify storage data objects that are to be written, read, created, or deleted. The storage processors run software that manages incoming storage requests and performs various data processing tasks to organize and secure the host data stored on the non-volatile storage devices.

In order to provide efficiency and reduce costs, some data storage systems have applied lossless data compression to the host data that they store. In general, data compression may advantageously allow a data storage system to use a smaller amount of storage resources (e.g. storage devices) to provide a given level of data storage services than would otherwise be possible without data compression.

The level of compression provided by a compression algorithm is sometimes referred to as the data compression ratio for that algorithm. Compression ratio is typically defined as the ratio between the size of the uncompressed data and the size of compressed data.

SUMMARY

Unfortunately, previous approaches to using data compression in data storage systems have exhibited significant shortcomings. Specifically, previously approaches have compressed data using a static block size that is defined internally by the data storage system. Such previous approaches have compressed blocks of host data of the same size regardless of how the host data is accessed on the data storage system. However, performing data compression using larger block sizes generally results in higher compression ratios between the size of the uncompressed data and the size of the compressed data. Accordingly, the use of static compression block sizes in previous systems has limited the compression ratios provided by such previous data storage systems. In particular, compression ratios provided by previous approaches have been limited to the compression ratios available when compressing blocks of data having a block size that is statically defined by the data storage system.

To address these and other shortcomings of previous approaches, new techniques are disclosed herein for performing data compression in which host application data access patterns are used to determine the size of the blocks of data to which compression is applied by the data storage system. The size of the individual data blocks to which compression is applied is referred to herein for purposes of explanation as the compression block size. In the disclosed system, at least one storage data object, such as a logical disk ("LUN"), is provided by the storage system to store data for a corresponding host application. The storage system may operate to determine one or more compression block sizes that may be used by the data storage system. In one embodiment, a compression block size may be determined that is based on a size of a typical data access performed by the host application on the storage data object, and the compression block size for the storage data object may be set to the size of the typical data access performed by the host application on the storage data object. When host data directed to the storage data object is received by the storage system, compressed host data for the storage data object may be generated by independently compressing individual blocks of the received host data, such that each individual, independently compressed block of the host data directed to the storage data object has a size equal to the compression block size for the storage data object. The compressed data for the storage data object is then stored into physical storage allocated to the storage data object on a physical storage device. In this way, the disclosed system may provide commensurately large compression ratios when relatively large typical data access sizes are present, without being limited to a compression ratio determined by a statically defined compression block size.

The size of the typical data access performed by the host application on the storage data object may be determined by monitoring input/output requests directed to the storage data object. The typical data access performed on the storage data object by the host application may, for example, be the most frequently used size of one or more sequential input/output requests directed to the storage data object. The compression block size for the storage data object may then be set to the size of the typical data access performed by the host application on the storage data object based on the monitoring of the input/output requests directed to the storage data object.

The size of the typical data access performed by the host application may alternatively be determined by receiving an application block size for the host application from a remote system administration system associated with the host application and setting the size of the typical data access performed by the host application on the storage data object to the application block size received from the remote system administration system associated with the host application. For example, in the case where the host application is a database application, the application block size received by the storage system from the remote system administration system associated with the host application may be the size of a table used by the database application to organize related data.

The disclosed techniques may establish different compression block sizes for different storage data objects provided by a single storage system. Accordingly, a given storage data object may be one of multiple storage data objects provided by the data storage system to store data for corresponding host applications, and the disclosed system may determine a size of the typical data access performed by the corresponding host application for each individual storage data object, and set a compression block size for each individual storage data object to the size of the typical data access performed by the corresponding host application on the storage data object.

The disclosed system may establish different compression block sizes for different portions of a single storage data object. Accordingly, a size of a typical data access performed by the host application on a portion of the storage data object may be determined, where the portion of the storage data object consists of a subset of the storage data object that is less than the whole storage data object. A compression block size for the portion of the storage data object may then be set to the size of the typical data access performed by the host application on that portion of the storage data object. Compressed host data may then be generated for only the portion of the storage data object by compressing host data received by the data storage system that is directed to the portion of the storage data object, by independently compressing individual blocks of the host data directed to that portion of the storage data object, such that each individual block of the host data directed to that portion of the storage data object is independently compressed and has a size equal to the compression block size for that portion of the storage data object.

Using the size of the typical data access to a storage data object as the compression block size is advantageous when the application accessing the data storage object application uses I/O requests that are all of the same size. For example, this may be the case for a database application in which all I/O requests have the same size as the basic block size for the database application. In such a scenario, a compression block size equal to the size of the typical data access to the storage data object is equal to the size of all I/O requests issued to the storage data object, and is accordingly optimal with regard to all data accesses in the data access pattern for the storage data object. However, in many situations, the data access pattern for a storage data object does not indicate a single data access size. Such a situation may arise due to an application using I/O requests having varied sizes, due to different applications accessing the storage data object using different size I/O requests, and/or due to user inputs (e.g. queries) causing a varied set of access sizes to be present even for an application that uses a single basic block size. In a case in which monitoring of the data access pattern does not reveal a single data access size, the disclosed system may calculate the performance of multiple potential compression block sizes in view of the specific data access pattern in order to select a compression block size to be used. Calculating a compression block size may be based on the sizes of the data accesses in the data access pattern. The overall performance of a given compression block size may reflect the amount of storage saved through the compression ratio it provides, offset by the costs of using it in the context of the specific data access pattern, in terms of response time and/or resource utilization costs. Costs of using a specific compression block size may be determined that reflect the percentages of data accesses in the data access pattern that have sizes that match and that do not match the compression block size, since processing of data accesses having sizes that do not match the size of the compression block size is not optimal, and typically results in higher response times and/or greater resource utilization than processing of data accesses whose sizes match the compression block size.

The disclosed system may operate to calculate the performance resulting from compressing host data using a compression block size for a storage data object, and the performance of different compression block sizes may be compared to determine which compression block size should be used. For example, the disclosed system may compare the performance resulting from using a compression block size equal to the size of the typical data access performed by a host application on the storage object to the performance resulting from using a compression block size that is equal to a fraction (e.g. one half) of the size of the typical data access performed by a host application on the storage object, and/or to the performance resulting from using a default compression block size.

The disclosed techniques may be embodied to provide significant advantages over previous approaches. For example, by using a compression block size that matches the size of the typical data access performed by the host application on a storage data object, the disclosed techniques allow for use of larger compression block sizes than would otherwise be used by previous systems, thus potentially providing improved compression ratios. Moreover, by using compression block sizes that match the size of the typical data accesses performed by host applications on individual storage data objects, and/or that matches the size of the typical data access performed on a portion of a storage data object, the disclosed techniques allow for compression block size and resulting performance benefits to closely reflect the actual use of the data stored on each storage data object, and/or within each storage data object.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that such embodiments are provided by way of example to illustrate various features and principles of the invention, and that the invention hereof is broader than the specific example embodiments disclosed.

The techniques for performing data compression described herein include using host application data access patterns to determine the size of the blocks of data to which compression is applied by a data storage system. A compression block size may be set to the size of the typical data access performed by a host application on a storage data object. When host data directed to the storage data object is received by the storage system, compressed host data is generated by independently compressing individual blocks of the received host data, such that individual blocks of the host data are independently compressed and each block has a size equal to the compression block size for the storage data object. The compressed data for the storage data object is then stored into physical storage allocated to the storage data object from a storage device.

Figure 1:
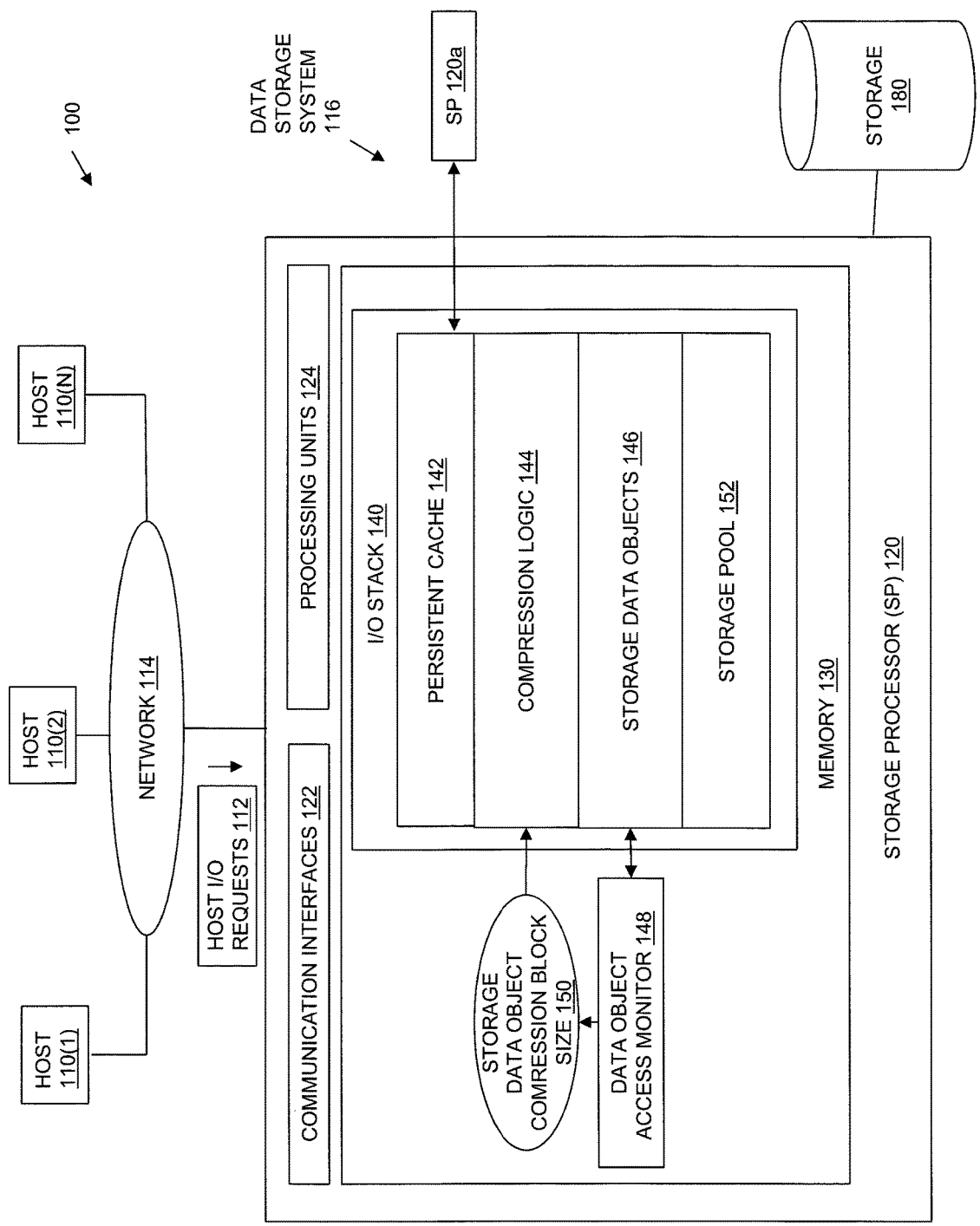
FIG. 1 is a block diagram showing components of an illustrative embodiment and an example of an environment in which embodiments of the disclosed techniques may be practiced.

FIG. 1 shows an example of an environment 100 in which embodiments of the disclosed techniques for compressing host data in a data storage system may be practiced. As shown in FIG. 1, multiple host computing devices ("hosts"), shown as Hosts 110(1) through 110(N), include host applications executing thereon, and access a Data Storage System 116 over a Network 114. The Data Storage System 116 includes a Storage Processor, or "SP," 120 and Storage 180. The Data Storage System 116 may include multiple SPs like the SP 120 (e.g., a second SP, 120*a*). For example, multiple SPs may be provided as circuit board assemblies, or "blades," which plug into a chassis that encloses and cools the SPs. The chassis has a backplane for interconnecting the SPs, and additional connections may be made among SPs using cables. However, no particular hardware configuration is required, as any number of SPs, including a single SP, may be provided and SP 120 may be embodied as any specific type of computing device capable of processing host input/output (I/O) requests.

Storage 180 may take the form of one or more disk drives. The disk drives may include magnetic disk drives, electronic flash drives, optical drives, and/or other types of physical storage drives.

Network 114 may include any specific type of network or combination of networks, such as a storage area network (SAN), a local area network (LAN), a wide area network (WAN), the Internet, and/or some other type of network or combination of networks. The Hosts 110(1-N), and/or the host applications executing on Hosts 110(1-N), may connect to the SP 120 using various technologies, such as Fibre Channel, iSCSI, NFS, SMB 3.0, and CIFS, for example. Any number of Hosts 110(1-N) and/or host applications executing in whole or in part on Hosts 110(1-N) may be provided, using any of the above protocols, some subset thereof, or other protocols besides those shown. As is generally known, Fibre Channel and iSCSI are block-based protocols, whereas NFS, SMB 3.0, and CIFS are file-based protocols. The SP 120 may be embodied or configured to receive Host I/O Requests 112 according to block-based and/or file-based protocols and to respond to such Host I/O Requests 112 at least in part by reading or writing storage resources within the Storage 180.

The SP 120 includes one or more Communication Interfaces 122, Processing Units 124, and Memory 130. The Communication Interfaces 122 may include, for example, SCSI target adapters and/or network interface adapters for converting electronic and/or optical signals received over the Network 114 to electronic form for use by the SP 120. Processing Units 124 may include one or more processing chips and/or assemblies. For example, Processing Units 124 may include numerous multi-core CPUs. Memory 130 may include volatile memory (e.g., RAM), and/or non-volatile memory, such as one or more ROMs, disk drives, solid state drives, and the like. Processing Units 124 and Memory 130 together form control circuitry, which is constructed and arranged to carry out various methods and functions as described herein. The Memory 130 stores a variety of software components that may be provided in the form of executable program code. For example, as shown in FIG. 1, memory 130 may include software components such as I/O Stack 140 and Data Object Access Monitor 148. When the program code is executed by Processing Units 124, Processing Units 124 are caused to carry out the operations of the software components. Although certain software components are shown and described for purposes of illustration and explanation, those skilled in the art will recognize that Memory 130 may include various other software components, such as an operating system, and various other applications, processes, etc. The I/O Stack 140 and Data Object Access Monitor 148 operate as a processing path for Host I/O Requests 112 received by Data Storage System 116.

I/O stack 140 includes a Persistent Cache 142, Compression Logic 144, Storage Data Objects 146, and Storage Pool 152. Various specific types of storage data objects may be provided in Storage Data Objects 146 for access by one or more application programs executing on Hosts 100(1-N), such as one or more logical disks referred to as "LUNs" (Logical Unit Numbers), host file systems, and/or VVols (virtual volumes, such as a virtual machine disk, e.g., as available from VMware, Inc. of Palo Alto, Calif.). Each one of the Storage Data Objects 146 may provide data storage for a corresponding one of the applications executing on Hosts 110(1-N). As each one of I/O Requests 112 is received, I/O Stack 140 determines which one of the Storage Data Objects 146 the request is directed to, and performs the requested operation on that storage data object.

Persistent Cache 142 may be implemented in DRAM (Dynamic Random Access Memory). The DRAM may be mirrored to DRAM on at least one other SP (e.g., on SP 120a), and the DRAM on both SPs may be backed up by battery. The contents of Persistent Cache 142 may thus persist on at least two SPs, even in the event of a power loss.

During operation of the components shown in FIG. 1, applications executing on Hosts 110(1-N) issue Host I/O Requests 112 to the Data Storage System 116. The SP 120 receives the Host I/O requests 112 at the Communication Interfaces 122 and passes the Host I/O Requests 112 to the I/O stack 140 for processing. The Host I/O Requests 112 include read requests and write requests directed to individual ones of the Storage Data Objects 146. Each write request specifies the one of the Storage Data Objects 146 to which it is directed, and also specifies (e.g. includes or indicates) the data that is to be written to the specified storage data object. For each one of the write requests received by Storage Processor 120, the specified data is stored in Persistent Cache 142. The Storage Processor 120 may provide an acknowledgment to a host that issued a write request once the data specified by the write request has been securely stored in Persistent Cache 142, indicating successful completion of the write request. The above process may be repeated for additional write requests specifying additional data to be written to various locations of the same one of the Storage Data Objects 146. The Persistent Cache 142 accumulates the data specified in the requests, e.g., in the order received, and may provide an acknowledgement to each one. In this way, data specified by one or more write requests directed to the same one of the Storage Data Objects 146 may be accumulated in Persistent Cache 142. Each write request also indicates a location at which the specified data is to be written relative to the specified one of the Storage Data Objects 146. For example, if the specified data object is a LUN, the write request may specify the location of the host data within the LUN as an offset into the LUN. If the data object is a host file system, the write request may specify the location of the data by file name and an offset into the named file.

At some point in the course of accumulating data in Persistent Cache 142 specified by one or more write requests directed to one of the Storage Data Objects 146, Compression Logic 144 performs data compression on the data accumulated in Persistent Cache 142, before the resulting compressed data is stored into physical storage resources allocated for the storage data object from Storage 180. For example, the host data accumulated in Persistent Cache 142 may be compressed continuously as it is received, periodically in response to a timer, and/or in response to the amount of host data accumulated in Persistent Cache 142 reaching a predetermined threshold level.

In accordance with the disclosed techniques, Data Object Access Manager 148 uses host application data access patterns to determine the size of blocks of the accumulated host data that are individually compressed by Compression Logic 144. For example, Data Object Access Monitor 148 may analyze I/O requests within I/O Requests 112 that are directed to a storage data object, e.g. as received from a corresponding host application executing in one or more of Hosts 110(1-N), in order to determine the size of a typical data access performed by the host application on that storage data object. The size of the typical data access performed by the host application on the storage data object may, for example, be the most frequent size of the data accesses performed on the storage data object. For example, in the case of a host application that uses a basic block size (e.g. a database application), and where each I/O request the host application performs on the storage data object has a size equal to the basic block size of the application, then Data Object Access Monitor 148 will determine that the size of a typical data access performed by the host application on the storage data object is equal to the size of 100% of the individual I/O requests performed on the data storage object, and pass that size to Compression Logic 144 as Storage Data Object Compression Block Size 150.

In another example, 100% of the individual I/O requests directed to the data storage object may not be of the same size, but a majority of the individual I/O requests directed to the data storage object may have the same size, and Data Object Access Monitor 148 will determine that the size of a typical data access performed by the host application on the storage data object is equal to the size of the majority of the individual I/O requests performed on the data storage object, and pass that size to Compression Logic 144 as Storage Data Object Compression Block Size 150.

In another example, if the application corresponding to a storage data object always or most frequently issues a specific number of sequential I/O requests to the storage data object, Data Access Monitor 148 may determine that the size of the typical host access to the data storage object is equal to the total size of the combined sequential I/O requests. For example, if the application corresponding to the storage data objects always or most frequently issues eight sequential I/O requests (eight sequential read and/or eight sequential write requests) that are each eight kilobytes in length to the storage data object, then Data Object Access Monitor 148 may determine that the size of a typical data access performed by the host application on the storage data object is sixty four kilobytes. Data Object Access Monitor 148 may then pass the value of sixty four kilobytes to Compression Logic 144 as Storage Data Object Compression Block Size 150.

Compression Logic 144 then sets the compression block size for the storage data object to Storage Data Object Compression Block Size 150, and subsequently compresses data stored in Persistent Cache 142 that is directed to that storage data object using a compression block size equal to Storage Data Object Compression Block Size 150. Accordingly, when received host data that is directed to the storage data object is subsequently stored in Persistent Cache 142, Compression Logic 144 generates compressed data by separately and independently compressing individual blocks of the received host data, where each one of the individual blocks has a length equal to Storage Data Object Compression Block Size 150. For example, in the case where Storage Data Object Compression Block Size 150 is equal to sixty four kilobytes, and in the event that Persistent Cache 142 contains one hundred and twenty eight kilobytes of received host data directed to the storage data object, Compression Logic 144 performs data compression by independently compressing each one of two sixty four kilobyte blocks of the received host data.

Various specific types of lossless compression may be used by Compression Logic 144 to compress individual blocks of the accumulated data contained in Persistent Cache 142. For example, lossless compression may be performed by Compression Logic 144 that identifies and eliminates statistical redundancy or redundancies in the blocks of received host data, in such a way that the resulting compressed data may be decompressed without any loss of information. Examples of lossless compression include Huffman coding, and Lempel-Ziv-Welch (LZW) lossless compression, as described in "A Technique for High-Performance Data Compression", by Terry A. Welch, published June 1984, in IEEE Computer, Volume 17, Issue 6, pages 8-19, all disclosures of which are hereby included herein by reference.

When independently compressing individual blocks of host data accumulated in the Persistent Cache 142, Compression Logic 144 may generate a separate translation table or dictionary for each block of host data that is independently compressed, that is subsequently required to decompress the compressed data generated for that individual block of host data in accordance with lossless compression algorithms such as Huffman coding and/or LZW.

The compressed data generated for the storage data object is then stored on corresponding physical storage in Storage 180 that is allocated to the storage data object. For example, when Persistent Cache 142 is flushed, I/O Stack 140 may operate to identify corresponding elements of physical storage that are allocated to the storage data object through a Storage Pool 152 that is used to realize the Storage Data Objects 146 in Storage 180. The Storage Pool 152 may be used to organize portions of storage devices in Storage 180 into units of storage that support Storage Data Objects 146. For example, in one embodiment, Storage Pool 152 organizes elements of Storage 180 into "slices" that are units of storage space (e.g. 256 megabytes or 1 gigabytes in size), which are derived from physical devices in Storage 180. In such an embodiment, the Storage Pool 152 allocates slices of the Storage 180 to form Storage Data Objects 146. In this way, the Storage Data Objects 146 may be built upon units of Storage 180 that are managed through Storage Pool 152, and that the disclosed techniques use to store the compressed data generated for each storage data object in Storage Data Objects 146.

Flushing of Persistent Cache 142 may occur in response to various specific triggers. For example, Persistent Cache 142 may be flushed in response to a total amount of accumulated data stored in Persistent Cache 142 reaching a predetermined threshold, periodic timing triggers, resource availability triggers, etc.

While the size of the typical data access performed by a host application on a storage data object may be determined by monitoring input/output requests directed to the storage data object, the disclosed techniques are not limited to that specific approach. The size of the typical data access performed by the host application may alternatively be determined by Data Storage System 116 receiving an application block size for the host application from a remote system administration system associated with the host application. Such a remote system administration system may consist of or include program code also executing on one of the Hosts 110(1-N). In response to receipt of the application block size, Data Object Access Monitor 148 may set the typical data access performed by the host application on the storage data object (e.g. in Storage Data Object Compression Block Size 150) to the application block size received from the remote system administration system associated with the host application. For example, in the case where the host application is a database application, the application block size received by Data Storage System 116 from the remote system administration system associated with the host application may be the size of a table used by the database application to organize related data during execution of the database application.

Figure 2:
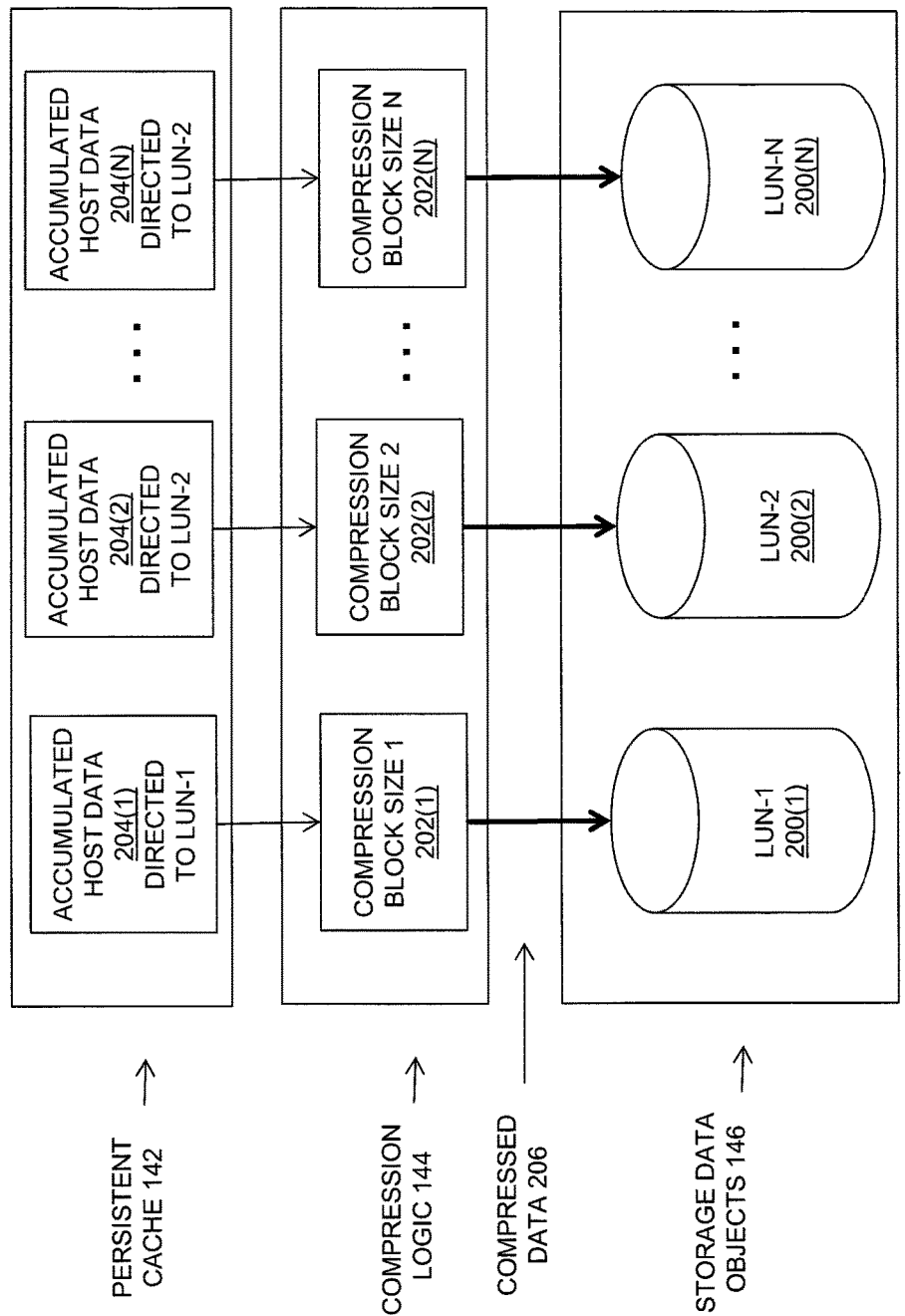
FIG. 2 is a block diagram showing an operational example of components in an illustrative embodiment.

The disclosed techniques may be embodied such that different compression block sizes are determined for different storage data objects provided by a single storage system, e.g. within Storage Data Objects 146. As shown in FIG. 2, Storage Data Objects 146 may include multiple storage data objects, for example multiple LUNs, shown for purposes of illustration as LUN-1 200(1), LUN-2 200(2), and so on through LUN-N 200(N). As host data is received by the Data Storage System 116, the received host data is accumulated in association with the specific storage data objects to which the host data is directed. Accordingly, Persistent Cache 142 includes received host data that is directed to each one of the storage data objects in Storage Data Objects 146, and shown in FIG. 2 by Accumulated Host Data 204(1) Directed to LUN-1, Accumulated Host Data 204(2) Directed to LUN-2, and so on through Accumulated Host Data 204(N) Directed to LUN-N. In the example of FIG. 2, Compression Logic 144 stores a different compression block size for each of the storage data objects in Storage Data Objects 146, shown by Compression Block Size 1 202(1) for LUN-1 200(1), Compression Block Size 2 202(2) for LUN-2 200(2), and so on through Compression Block Size N 202(N) for LUN-N 200(N). When Compression Logic 144 compresses the received host data stored in Persistent Cache 142, the size of the individual blocks of the received host data that are independently compressed to generate Compressed Data 206 depends on the compression block size of the storage data object to which the data is directed. Accordingly, data compression is independently applied to individual blocks of Accumulated Host Data 204(1) Directed to LUN-1 that each have a size equal to Compression Block Size 1 202(1), data compression is independently applied to individual blocks of Accumulated Host Data 204(1) Directed to LUN-1 that each have a size equal to Compression Block Size 2 202(2), and so on through applying data compression to individual blocks of Accumulated Host Data 204(1) Directed to LUN-1 that each have a size equal to Compression Block Size 1 202(1).

Within a single storage data object, the disclosed techniques may be embodied to determine and store within Compression Logic 144 different compression block sizes for different portions of the storage data object. Accordingly, Data Object Access Monitor 148 may determine a size of a typical data access performed by the host application on a portion of the corresponding storage data object, where the portion of the storage data object consists of a subset of the storage data object that is less than the whole storage data object. For example, Data Object Access Monitor 148 may determine a compression block size for the portion of the storage data object as the size of the typical data access performed by the host application on that portion of the storage data object. The compression block size for each different portion of the storage data object may then be stored in and used by Compression Logic 144. Compression Logic 144 may then operation to generate compressed data for each individual portion of the storage data object by compressing host data received by the data storage system that is directed to that portion of the storage data object, by independently compressing individual blocks of the host data directed to that portion of the storage data object, such that each individual block of the received host data directed to that portion of the storage data object is independently compressed and has a size equal to the compression block size for that portion of the storage data object.

In many circumstances, Data Object Access Monitor 148 may detect a data access pattern in which the data accesses performed by a host application on the storage data object are not all of a single size. For example, a host application may use I/O requests having varied sizes, and/or different applications accessing the storage data object may use a varied set of different size I/O requests. Moreover, even when a host application, such as a database application, uses a single block size, user inputs (e.g. queries) may cause a varied set of I/O request sizes to be present in the data access pattern, and the typical size of data accesses may not equal the basic block size of the application. In such cases, Data Object Access Monitor 148 may determine Storage Data Object Compression Block Size 150 by calculating the performance of a number of different compression block sizes in view of the data access pattern in order to select a compression block size to be used as Storage Data Object Compression Block Size 150.

For each compression block size under consideration, Data Object Access Monitor 148 may determine a performance equal to the amount of storage saved through the compression ratio provided by the compression block size, offset by the costs of using the compression block size, e.g. in terms of response time and resource utilization, within the context of the specific data access pattern detected for the storage object by Data Access Monitor 148. As noted above, compression ratio generally will improve as larger compression block sizes are used. The cost of using a specific compression block size in terms of response time and system resource utilization typically reflects the percentage of the data accesses in the data access pattern having sizes that match the compression block size, which will be optimally processed, and the percentage of the data accesses in the data access pattern that do not match the compression block size, which will not be optimally processed. Processing of data accesses having sizes that do not match the size of the compression block is not optimal, and results in relatively higher costs, because the storage system has to perform compression and/or decompression, as well as accesses to Storage 180, using units of data that do not match the size of the data access. For example, in the case of a compression block size of 64 kilobytes, processing of random 8 kilobyte I/O read requests requires retrieving and decompressing the compressed data for 64 kilobytes of uncompressed data, in order to process each 8 kilobyte I/O read request. The requirement of retrieving and decompressing compressed data for a unit of uncompressed data that is larger than the size of an I/O read request is one example of how higher costs in terms of response time and/or system resource utilization (e.g. CPU utilization) may result when processing data accesses in the data access pattern whose sizes do not match the compression block size.

For example, Data Object Access Monitor 148 may monitor the data access pattern for a storage data object having a useable data size of one terabyte, and operate to determine whether to set Storage Data Object Compression Block Size 150 to either 8 kilobytes, or to 64 kilobytes, based on the relative performance of the two potential compression block sizes in view of a detected data access pattern. To determine the performance of the two potential compression block sizes, Data Object Access Monitor 148 determines that, given a specific lossless data compression algorithm available to the data storage system, performing data compression using a compression block size of 8 kilobytes provides a compression ratio of 2:1, resulting in the compressed data for the one terabyte of uncompressed data having a size of 500 gigabytes. Data Object Access Monitor 148 may further determine that using the same lossless data compression algorithm, performing data compression using a compression block size of 64 kilobytes provides a larger compression ratio of 5:1, resulting in the compressed data for the one terabyte of uncompressed data having a size of 200 gigabytes. Data Object Access Monitor 148 accordingly determines that the amount of storage saved in Storage 180 using a compression block size of 64 kilobytes is 800 gigabytes, while the amount of storage saved in Storage 180 through using a compression block size of 8 kilobytes is 500 gigabytes.

Further with regard to the example of determining the performance of these two potential compression block sizes, Data Object Access Monitor 148 determines and utilizes the current data access pattern detected for the storage data object, which for example may indicate that fifty percent of the I/O requests per second (TOPS) performed on the storage data object have a size of 64 kilobytes, and fifty percent of the I/O requests per second performed on the storage data object have a size of 8 kilobytes. Based on this data access pattern, Data Object Access Monitor 148 calculates the costs associated with using both potential compression block sizes, e.g. in terms of response time and/or system resource (e.g. CPU) utilization.

First, for the potential compression block size of 64 kilobytes, Data Object Access Monitor 148 determines the cost of processing the fifty percent of the I/O requests in the data access pattern having a size of 64 kilobytes by the storage system, which will be optimally processed using the compression block size of 64 kilobytes. Specifically, the cost of processing each 64 kilobyte read I/O request using a 64 kilobyte compression block size will include the cost of retrieving 64/5 kilobytes of compressed data from Storage 180 and then decompressing the 64/5 kilobytes of compressed data. The cost of processing each 64 kilobyte write I/O request using a 64 kilobyte compression block size will include the cost of compressing of 64 kilobytes of uncompressed data from the write request and storing of the resulting 64/5 kilobytes of compressed data into Storage 180.

Further with regard to calculating the performance of the potential compression block size of 64 kilobytes, Data Object Access Monitor 148 also determines the cost of processing the fifty percent of the I/O requests in the data access pattern having a size of 8 kilobytes, which will not be optimally processed when using a compression block size of 64 kilobytes. Specifically, the cost of processing each 8 kilobyte read I/O request using a 64 kilobyte compression block size will include the costs of retrieving and decompressing 64/5 kilobytes of compressed data from Storage 180. The cost of processing each 8 kilobyte write I/O request using a 64 kilobyte compression block size will include the costs of retrieving 64/5 kilobytes of compressed data from Storage 180, decompressing the 64/5 kilobytes of compressed data read from Storage 180, compressing 64 kilobytes of uncompressed data including the data from write request, and storing the resulting 64/5 kilobytes of compressed data to Storage 180.

Accordingly, the cost of processing the I/O requests in the detected data access pattern when using a 64 kilobyte compression block size may generally be expressed at least in part by the below summation that adds a) the cost of processing the fifty percent of the I/O requests having a size of 64 kilobytes in terms of the amount of compressed data that must be accessed in Storage 180 for each request when using the 64 kilobyte compression block size, to b) the cost of processing the fifty percent of the I/O requests having a size of 8 kilobytes in terms of the amount of compressed data that must be accessed in Storage 180 for each request when using the 64 kilobyte compression block size:

(50%*64/5 kilobytes)+(50%*64/5 kilobytes)

The cost of processing the I/O requests in the detected data access pattern when using a 64 kilobyte compression block size may further be expressed at least in part by the below summation that adds a) the cost of processing the fifty percent of the I/O requests having a size of 64 kilobytes in terms of the number of read I/O operations on the Storage 180 that must be performed by the data storage system for each request when using the 64 kilobyte compression block size, to b) the cost of processing the fifty percent of the I/O requests having a size of 8 kilobytes in terms of the number of read I/O operations on the Storage 180 that must be performed by the data storage system for each request when using the 64 kilobyte compression block size:

(50%*1 read operation)+(50%*1 read operation)

To calculate the performance of the potential compression block size of 8 kilobytes, Data Object Access Monitor 148 determines the cost of processing the fifty percent of the I/O requests in the data access pattern having a size of 64 kilobytes, which will basically be optimally processed using a compression block size of 8 kilobytes, in terms of reading compressed data from Storage 180, since the cost of processing each 64 kilobyte read I/O request using an 8 kilobyte compression block size will include the cost of retrieving 64/2 kilobytes of compressed data from Storage 180 and then decompressing the 64/2 kilobytes of compressed data. However, the cost of processing each 64 kilobyte read I/O request using an 8 kilobyte compression block size may also include the cost of issuing four separate reads to Storage 180 in order to obtain the four separately compressed blocks of uncompressed data that make up the 64/2 kilobytes of compressed data. The cost of processing each 64 kilobyte write I/O request using an 8 kilobyte compression block size will include the cost of compressing 64 kilobytes of uncompressed data from the write request into 64/2 kilobytes of compressed data, based on 8 kilobyte blocks within the 64 kilobytes of uncompressed data, and storing the resulting 64/2 kilobytes as four separate blocks of compressed data into Storage 180.

Further with regard to calculating the performance of the potential compression block size of 8 kilobytes, Data Object Access Monitor 148 also determines the cost of processing the fifty percent of the I/O requests in the data access pattern having a size of 8 kilobytes, which will be optimally processed using the compression block size of 8 kilobytes. Specifically, the cost of processing each 8 kilobyte read I/O request using an 8 kilobyte compression block size will include the costs of reading and decompressing 8/2 kilobytes of compressed data from Storage 180, and the cost of processing each 8 kilobyte write I/O request using an 8 kilobyte compression block size will include the costs of compressing the 8 kilobytes of data from write I/O request, and writing the resulting 8/2 kilobytes of compressed data to Storage 180.

Accordingly, the cost of processing the I/O requests in the detected data access pattern when using an 8 kilobyte compression block size may generally be expressed at least in part by the below summation that adds a) the cost of processing the fifty percent of the I/O requests having a size of 64 kilobytes in terms of the amount of compressed data that must be accessed in Storage 180 for each request when using an 8 kilobyte compression block size, to b) the cost of processing the fifty percent of the I/O requests having a size of 8 kilobytes in terms of the amount of compressed data that must be accessed in Storage 180 for each request when using an 8 kilobyte compression block size:

(50%*64/2 kilobytes)+(50%*8/2 kilobytes)

The cost of processing the I/O requests in the detected data access pattern when using an 8 kilobyte compression block size may further be expressed at least in part by the below summation that adds a) the cost of processing the fifty percent of the I/O requests having a size of 64 kilobytes in terms of the number of read I/O operations on the Storage 180 that must be performed by the data storage system for each request when using the 8 kilobyte compression block size, to b) the cost of processing the fifty percent of the I/O requests having a size of 8 kilobytes in terms of the number of read I/O operations on the Storage 180 that must be performed by the data storage system for each request when using the 8 kilobyte compression block size:

(50%*8 read operations)+(50%*1 read operation)

After calculating the performance of the potential compression block sizes of 64 kilobytes and 8 kilobyte, Data Object Access Monitor 148 may compare the performance resulting from using a compression block size of 64 kilobytes to the performance resulting from using a compression block size of 8 kilobytes to determine whether a total performance benefit of using the larger compression block size exceeds a threshold minimum performance benefit. Data Object Access Monitor 148 may then set Storage Data Object Compression Block Size 150 to the larger compression block size if the performance benefit of using the larger compression block size exceeds the threshold minimum performance benefit.

For example, the amount of storage saved in Storage 180 using each of the compression block sizes may be converted to a dollar value, e.g. based on some dollar cost per gigabyte of storage. For example, a cost per gigabyte of storage may be predetermined or configured to be $5.00. In such an example, since the amount of storage saved in Storage 180 using a compression block size of 64 kilobytes is 800 gigabytes, the dollar value of the amount of storage saved in Storage 180 using a compression block size of 64 kilobytes may, for example, be $4000.00. Since the amount of storage saved in Storage 180 using a compression block size of 8 kilobytes is 500 gigabytes, the dollar value of the amount of storage saved in Storage 180 using a compression block size of 8 kilobytes may similarly be determined to be $2500.00. A dollar amount representing the amount of storage saved due to using the larger 64 kilobyte compression block size versus the 8 kilobyte compression block size using a cost per gigabyte of $5.00 may be thus be determined to be $1500.00.

Data Object Access Monitor 148 may also determine that using the larger 64 kilobyte compression block size in the context of the detected data pattern would result in an average response time that is 1 millisecond greater than the average response time using the smaller compression block size of 8 kilobytes. This cost of using the larger compression block size in terms of increased response time may also be converted to a dollar value, for example using a predetermined or configured dollar value per millisecond of response time. For example, the increase in response time resulting from using the larger compression block size may be converted to a dollar value based on a cost per millisecond of response time of $1000.00. Accordingly, Data Object Access Monitor 148 may determine that the total performance benefit of using the larger compression block size of 64 kilobytes would be equal to a dollar amount of $500.00, which is $1500.00 (the dollar value of the amount of storage saved due to using the larger compression block size), minus $1000.00 (the dollar value of the increase in response time due to using the larger compression block size).

Data Object Access Monitor 148 may then compare the total performance benefit of using the larger compression block size to a threshold minimum performance benefit (e.g. another predetermined or configured dollar value). If the total performance benefit of using the larger compression block size exceeds the threshold minimum performance benefit, then Data Object Access Monitor 148 sets Storage Data Object Compression Block Size 150 to the larger compression block size. Otherwise, Data Object Access Monitor 148 may set Storage Data Object Compression Block Size 150 to the smaller compression block size (e.g. leave the current compression block size unchanged). Those skilled in the art will recognize that the threshold minimum performance benefit may be predetermined or configured to any value, including zero. In the case where the threshold minimum performance benefit is zero, then the above described process may cause Data Object Access Monitor 148 to set Storage Data Object Compression Block Size 150 to the potential compression block size having the highest performance (e.g. highest performance dollar value) based on the detected data access pattern.

In another example, Data Object Access Monitor 148 may only set Storage Data Object Compression Block Size 150 to a given compression block size if the average response time resulting from using that compression block size does not exceed a maximum threshold response time. For example, in the case of a predetermined or configured maximum response time of 2 milliseconds, the Data Object Access Monitor 148 may select a compression block size for Storage Data Object Compression Block Size 150 that has the higher performance of the potential compression block sizes, unless using that compression block size would result in an average response time of greater than 2 milliseconds.

While the above examples are given with reference to calculating a total performance benefit based on a dollar value representing the amount of storage saved using a given compression block size, and a dollar value representing the amount of response time introduced using a given compression block size, those skilled in the art will recognize that the a performance benefit for a compression block size may additionally or alternatively be based on a dollar value representing an amount of system resources (e.g. CPU resources) consumed when using a given compression block size. Thus the performance resulting from using a given compression block size in the context of a detected data access pattern may be calculated by Data Object Access Monitor 148 based on one or more of a) storage saved based on the compression ratio provided by the compression block size, b) impact on response time caused by using the compression block size, and/or c) impact on system resource utilization caused by using the compression block size. Performances for different compression block sizes for a data access pattern may then be calculated in this way and compared to determine which compression block size to be used as Storage Data Object Compression Block Size 150.

Figure 3:
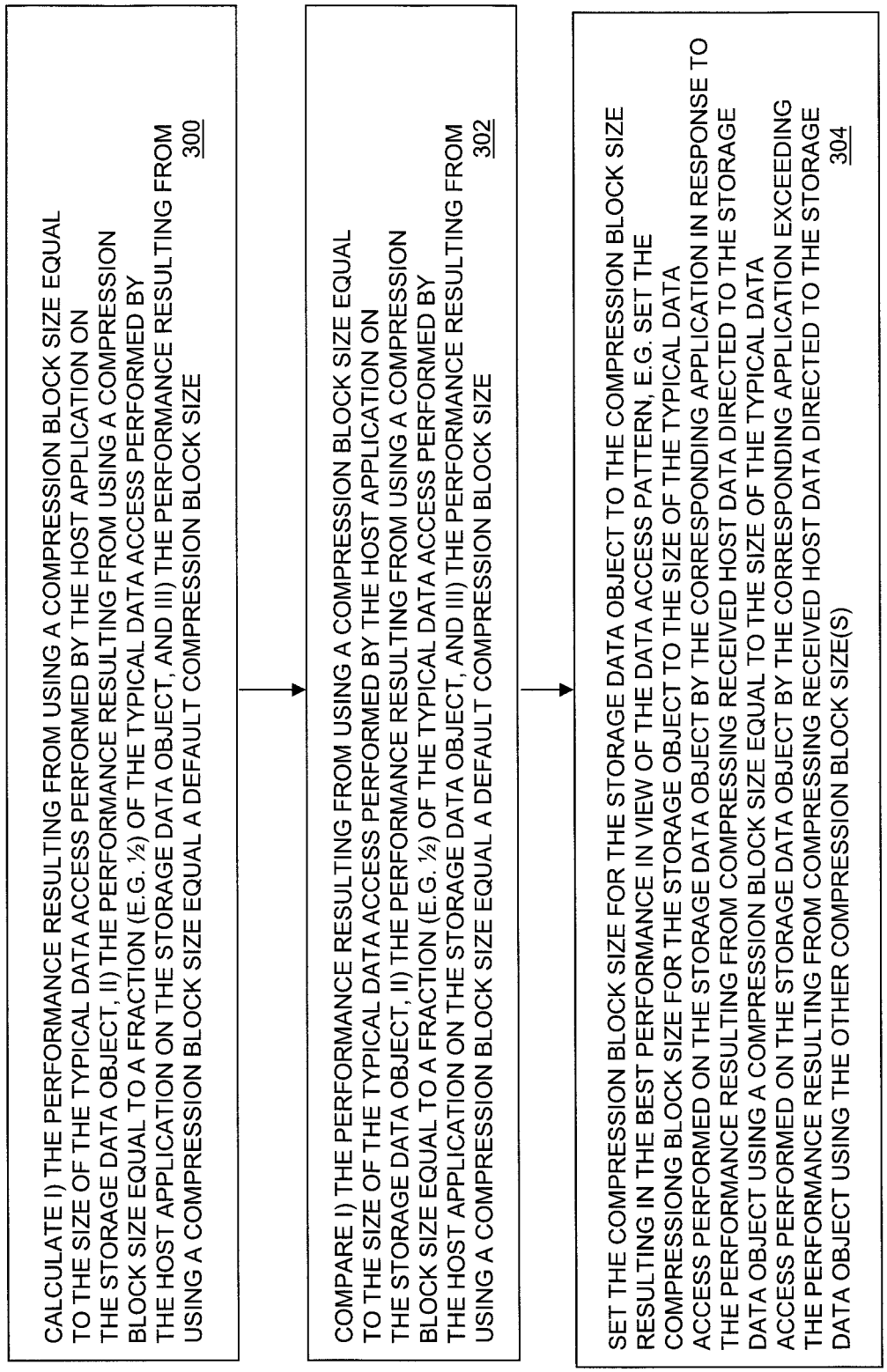
FIG. 3 is a flow chart showing steps performed by an illustrative embodiment to determine performance benefits of different compression block sizes.

As described above, the disclosed techniques may be embodied to calculate the performance of the data storage system when compressing host data directed to a storage data object using a compression block size, in view of a detected data access pattern, and then that level of performance compared to the performance of the data storage system when compressing the host data directed to the storage data object using a different compression block size, in view of the same detected data access pattern, in order to determine which compression block size to use for the storage data object. In this way the disclosed techniques may be embodied to determine whether to set the compression block size for a storage data object to the size of a typical data access performed on the storage data object by the corresponding host application, or to some other compression block size. FIG. 3 is a flow chart showing an example of steps performed by an illustrative embodiment to determine whether to set the compression block size for a storage data object to the size of a typical data access performed on the storage data object, or to another compression block size, based on the performance calculated for different compression block sizes, as described above. The steps of FIG. 3 may, for example, be performed by the Compression Logic 144 and/or Data Object Access Monitor 148 shown in FIG. 1.

As shown in FIG. 3, at step 300, the disclosed system may operate to calculate the performance resulting from compressing host data using multiple compression block sizes. For example, at step 300 the disclosed system may calculate i) the performance resulting from using a compression block size equal to the size of the typical data access performed by the host application on the storage data object, ii) the performance resulting from using a compression block size equal to a fraction (e.g. ½) of the typical data access performed by the host application on the storage data object, and/or iii) the performance resulting from using a compression block size equal to a default compression block size (e.g. 8 kilobytes or some other predetermined default compression block size). For example, the disclosed system may calculate a dollar value representing the performance resulting from compressing host data using each of the compression block sizes by subtracting i) a value (e.g. dollar value) representing the response time and/or system resource utilization costs of compressing host data directed to the storage data object using the compression block size, from ii) a value (e.g. dollar value) representing the amount of storage saved through the compression ratio provided by the compression block size.

At step 302 of FIG. 3, the disclosed system compares i) the performance resulting from using a compression block size equal to the size of the typical data access performed by the host application on the storage data object, ii) the performance resulting from using a compression block size equal to a fraction (e.g. ½) of the typical data access performed by the host application on the storage data object, and iii) the performance resulting from using a compression block size equal to the default compression block size. For example, at step 302 the disclosed system may compare i) the dollar value representing the performance resulting from using a compression block size equal to the size of the typical data access performed by the host application on the storage data object, ii) the dollar value representing the performance resulting from using a compression block size equal to a fraction (e.g. ½) of the typical data access performed by the host application on the storage data object, and iii) the dollar value representing the performance resulting from using a compression block size equal to the default compression block size.

At step 304, the disclosed system sets the compression block size for the storage data object to the compression block size resulting in the best performance in view of the data access pattern. For example, the disclosed system sets the compression block size for the storage object to the size of the typical data access performed on the storage data object by the corresponding application in response to calculating that the performance resulting from compressing received host data directed to the storage data object using a compression block size equal to the size of the typical data access performed on the storage data object by the corresponding application exceeds the performance resulting from compressing received host data directed to the storage data object using the other compression block size(s). Alternatively, the disclosed system sets the compression block size for the storage object to a fraction (e.g. ½) of the size of the typical data access performed on the storage data object by the corresponding application in response to calculating that the performance resulting from compressing received host data directed to the storage data object using a compression block size equal to a fraction (e.g. ½) of the size of the typical data access performed on the storage data object by the corresponding application exceeds the performance resulting from compressing received host data directed to the storage data object using the other compression block size(s). And similarly, the disclosed system sets the compression block size for the storage object to the default compression block size in response to calculating that the performance resulting from compressing received host data directed to the storage data object using the default compression block size exceeds the performance resulting from compressing received host data directed to the storage data object using the other compression block size(s).

Figure 4:
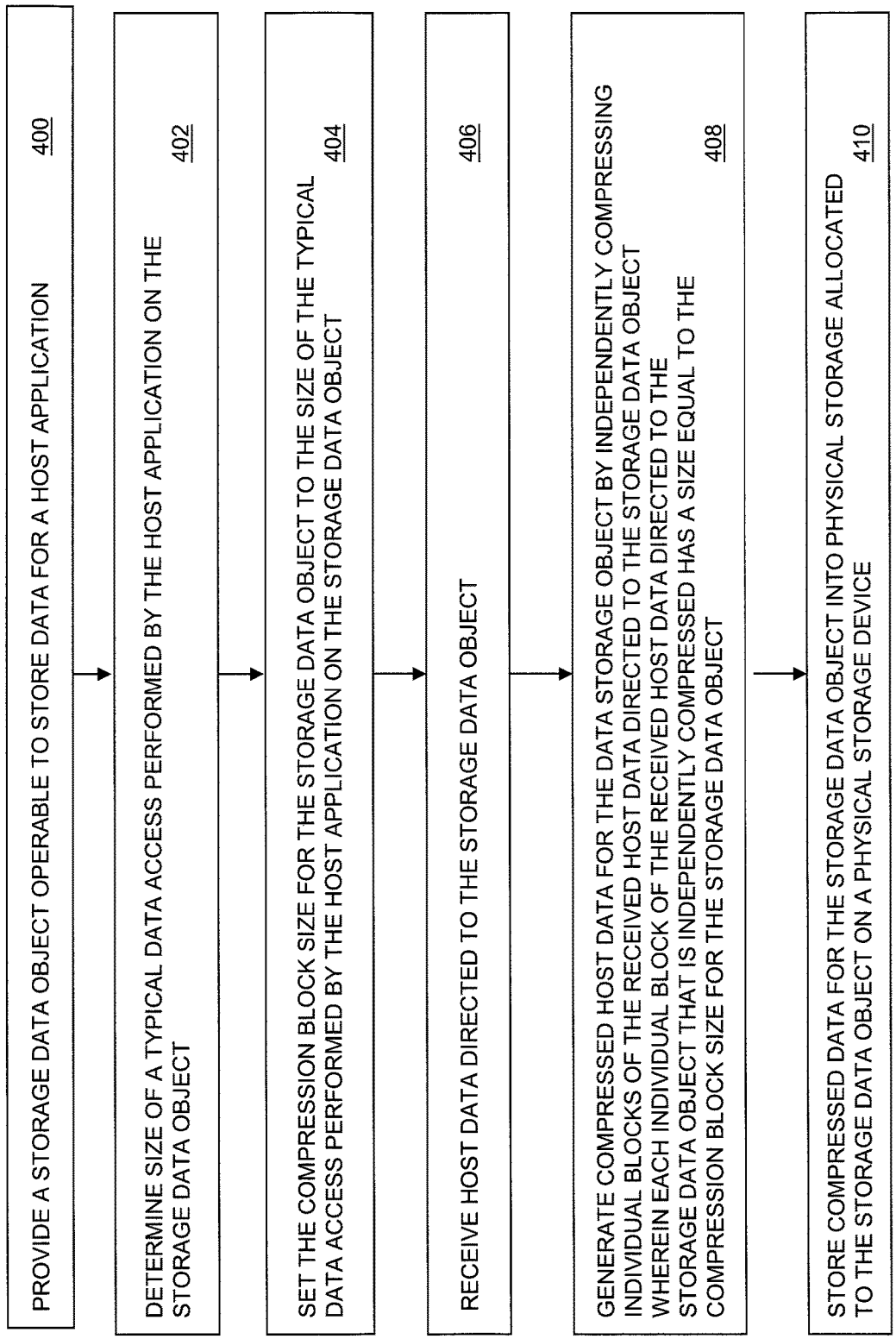
FIG. 4 is a flow chart showing steps performed by an illustrative embodiment to determine a compression block size based on the size of typical application data accesses.

FIG. 4 is a flow chart showing steps performed by an illustrative embodiment to determine a compression block size based on the size of typical application data accesses. The steps of FIG. 4 may, for example, be performed by the Compression Logic 144 and/or Data Object Access Monitor 148 shown in FIG. 1. At step 400, the disclosed system provides at least one storage data object, such as a logical disk ("LUN"), to a corresponding host application for use by the host application to store data. At step 402, the disclosed system determines a size of a typical data access performed by the host application on the storage data object. At step 404, the disclosed system sets a compression block size for the storage data object to the size of the typical data access performed by the host application on the storage data object. At step 406, host data directed to the storage data object is received by the storage system from the host application, and at step 408 compressed host data for the storage data object is generated by independently compressing individual blocks of the received host data, such that each individual, independently compressed block of the host data directed to the storage data object has a size equal to the compression block size for the storage data object. The compressed data for the storage data object is then stored at step 410 into physical storage allocated to the storage data object on a physical storage device.

The disclosed techniques may be embodied to provide significant advantages over previous approaches. For example, by using a compression block size that matches the size of the typical data access performed by the host application on a storage data object, the disclosed techniques allow for use of larger compression block sizes than default compression block sizes that would otherwise be used by previous systems, thus potentially providing improved compression ratios. Moreover, by using compression block sizes that match the size of the typical data accesses performed by host applications on individual storage data objects, and/or that matches the size of the typical data access performed on a portion of a storage data object, the disclosed techniques allow for compression block size and resulting performance benefits to more closely reflect the actual use of the data stored on each storage data object, and/or within each storage data object.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above. For example, it should be understood that some data storage systems may be configured to run host applications locally, i.e., in the memory 130 of the SP 120. In these arrangements, the Host I/O Requests 112 may arise internally, i.e., from the locally running applications, rather than being received from an external host.

In another example, while reference is made above to determining a performance benefit of using a given compression block size for performing data compression for received host data directed to a storage data object based on compression improvement and response time cost, the disclosed techniques are not limited to using only those specific performance factors, and may use other specific factors when determining performance benefit. For example, a resulting level of utilization of storage system resources, e.g. of the storage system CPU, etc., may be used in addition to, or in lieu of compression improvement and/or response time cost to determine a performance benefit resulting from using a given compression block size when compressing received host data directed to a storage data object.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of providing data compression in a data storage system, comprising:

providing a storage data object operable to persistently store data for a host application executing on a remote host computer;

determining a size of a typical data access performed by the host application on the storage data object at least in part by monitoring the sizes of input/output requests received by the data storage system from the host application and directed to the storage data object to determine the size of the typical data access performed by the host application on the storage data object;

responsive to the monitoring of the input/output requests received by the data storage system from the host application and directed to the storage data object, setting a compression block size for the storage data object to a value equal to the size of the typical data access performed by the host application on the storage data object;

receiving, by the data storage system from the host application, uncompressed host data directed to the storage data object;

generating, by the data storage system, compressed host data for the storage data object by independently compressing individual blocks of the uncompressed received host data directed to the storage data object, wherein each individual block of the uncompressed received host data directed to the storage data object that is independently compressed has a size equal to the compression block size for the storage data object; and storing, by the data storage system, the compressed data for the storage data object into non-volatile physical storage allocated to the storage data object on at least one non-volatile physical storage device within the data storage system.

2. The method of claim 1, further comprising:
wherein the storage data object is one of a plurality of storage data objects provided by the data storage system to store data for corresponding ones of a plurality of host applications executing on a plurality of remote host computers; and for each individual one of the storage data objects, determining a size of the typical data access performed by the corresponding host application on the individual storage data object at least in part by monitoring the sizes of input/output requests received by the data storage system from the corresponding host application and directed to the storage data object to determine a size of the typical data access performed by the corresponding host application on the storage data object, and, responsive to the monitoring of the input/output requests received by the data storage system from the corresponding host application and directed to the storage data object, setting a compression block size for the individual storage data object to the size of the typical data access performed by the corresponding host application on the individual storage data object.

3. The method of claim 1, further comprising:
determining a size of a typical data access performed by the host application on a portion of the storage data object, wherein the portion of the storage data object consists of a subset of the storage data object that is less than the whole storage data object;

setting a compression block size for the portion of the storage data object to the size of the typical data access performed by the host application on the portion of the storage data object; and generating compressed host data for the portion of the storage data object by compressing host data received by the data storage system that is directed to the portion of the storage data object by independently compressing individual blocks of the host data directed to the portion of the storage data object, wherein each individual block of the host data directed to the portion of the storage data object is independently compressed and has a size equal to the compression block size for the portion of the storage data object.

4. The method of claim 1, further comprising:
calculating performance resulting from using each one of a plurality of compression block sizes to compress host data directed to the data storage object based on a current data access pattern, wherein the plurality of compression block sizes includes the size of the typical data access performed by the host application on the storage data object;

comparing the performances resulting from using each one of the plurality of compression block sizes to compress host data directed to the data storage object; and wherein setting the compression block size for the storage data object to the size of the typical data access performed by the host application on the storage data object is responsive to the performance resulting from using the compression block size equal to the size of the typical data access performed by the host application on the data storage data object to compress host data directed to the data storage object exceeding the performance resulting from using the other ones of the plurality of compression block sizes to compress host data directed to the data storage object.

5. The method of claim 4, wherein the plurality of compression block sizes includes a compression block size equal to a fraction of the size of the typical data access performed by the host application on the data storage object; and wherein setting the compression block size for the storage data object to the size of the typical data access performed by the host application on the storage data object is responsive to the performance resulting from using the compression block size equal to the size of the typical data access performed by the host application on the data storage data object to compress host data directed to the data storage object exceeding the performance resulting from using the compression block size equal to a fraction of the size of the typical data access performed by the host application on the data storage object.

6. The method of claim 5, wherein the plurality of compression block sizes further includes a default compression block size; and wherein setting the compression block size for the storage data object to the size of the typical data access performed by the host application on the storage data object is further responsive to the performance resulting from using the compression block size equal to the size of the typical data access performed by the host application on the data storage data object to compress host data directed to the data storage object exceeding the performance resulting from using the compression block size equal to the default compression block size.

7. The method of claim 1, wherein monitoring the sizes of input/output requests received by the data storage system from the host application and directed to the storage data object to determine the size of the typical data access performed by the host application on the storage data object includes detecting the most frequent size of the data accesses performed on the storage data object; and wherein setting the compression block size for the storage data object to the value equal to the size of the typical data access performed by the host application on the storage data object comprises setting the compression block size for the storage object to a value equal to the most frequent size of the data accesses performed on the storage data object.

8. The method of claim 7, further comprising:
storing the received host data directed to the storage data object into a persistent cache that is located within the data storage system; and wherein generating the compressed host data for the storage data object comprises individually compressing individual blocks of the received host data directed to the storage data object while the received host data directed to the storage data object is stored in the persistent cache.

9. The method of claim 1, wherein generating compressed host data for the storage data object by independently compressing individual blocks of the uncompressed received host data directed to the storage data object includes:

generating a separate translation table for each individual block of the uncompressed received host data directed to the storage data object; and wherein the translation table generated for each individual block of the uncompressed received host data directed to the storage data object is required to decompress the compressed data generated for that individual block of host data in accordance with a lossless compression algorithm.

10. The method of claim 1, wherein the uncompressed received host data directed to the storage data object comprises data specified by at least one write request that is directed to the storage data object and received from the remote host computer.

11. The method of claim 1, wherein the size of the typical data access performed by the host application on the storage data object comprises a total size of a specific number of sequential I/O requests most frequently issued by the host application to the data storage object.

12. A data storage system, comprising:
   a set of physical storage devices;
   a set of processing units;
   a memory coupled to the processing units, the memory storing program code for providing data compression which, when executed by the set of processing units, causes the set of processing units to:
      provide a storage data object operable to store data for a host application executing on a remote host computer,
      determine a size of a typical data access performed by the host application on the storage data object, at least in part by causing the set of processing units to monitor the sizes of input/output requests received by the data storage system from the host application and directed to the storage data object to determine the size of the typical data access performed by the host application on the storage data object,
      responsive to the monitoring of the input/output requests received by the data storage system from the host application and directed to the storage data object, set a compression block size for the storage data object to a value equal to the size of the typical data access performed by the host application on the storage data object,
      receive uncompressed host data directed to the storage data object,
      generate compressed host data for the storage data object by independently compressing individual blocks of the uncompressed received host data directed to the storage data object, wherein each individual block of the uncompressed received host data directed to the storage data object that is independently compressed has a size equal to the compression block size for the storage data object, and
      store the compressed data for the storage data object into non-volatile physical storage allocated to the storage data object on at least one physical storage device within the set of physical storage devices.

13. The apparatus of claim 12, wherein the storage data object is one of a plurality of storage data objects provided by the data storage system to store data for corresponding ones of a plurality of host applications executing on a plurality of remote host computers, and wherein the program code, when executed by the processing units, further causes the processing units to:
   for each individual one of the storage data objects, determine a size of the typical data access performed by the corresponding host application on the individual storage data object at least in part by causing the processing units to monitor the sizes of input/output requests received by the data storage system from the corresponding host application and directed to the storage data object to determine a size of the typical data access performed by the corresponding host application on the storage data object, and, responsive to the monitoring of the input/output requests received by the data storage system from the corresponding host application and directed to the storage data object, setting a compression block size for the individual storage data object to the size of the typical data access performed by the corresponding host application on the individual storage data object.

14. The apparatus of claim 12, wherein the program code, when executed by the processing units, further causes the processing units to:
   determine a size of a typical data access performed by the host application on a portion of the storage data object, wherein the portion of the storage data object consists of a subset of the storage data object that is less than the whole storage data object;
   set a compression block size for the portion of the storage data object to the size of the typical data access performed by the host application on the portion of the storage data object; and
   generate compressed host data for the portion of the storage data object by compressing host data received by the data storage system that is directed to the portion of the storage data object by independently compressing individual blocks of the host data directed to the portion of the storage data object, wherein each individual block of the host data directed to the portion of the storage data object is independently compressed and has a size equal to the compression block size for the portion of the storage data object.

15. The apparatus of claim 12, wherein the program code, when executed by the processing units, further causes the processing units to:
   calculate performances resulting from using each one of a plurality of compression block sizes to compress host data directed to the data storage object based on a current data access pattern, wherein the plurality of compression block sizes includes the size of the typical data access performed by the host application on the storage data object;
   compare the performances resulting from using each one of the plurality of compression block sizes to compress host data directed to the data storage object; and
   wherein setting the compression block size for the storage data object to the size of the typical data access performed by the host application on the storage data object is responsive to the performance resulting from using the compression block size equal to the size of the typical data access performed by the host application on the data storage data object to compress host data directed to the data storage object exceeding the performance resulting from using the other ones of the plurality of compression block sizes to compress host data directed to the data storage object.

16. The apparatus of claim 15, wherein the plurality of compression block sizes includes a compression block size equal to a fraction of the size of the typical data access performed by the host application on the data storage object; and
   wherein setting the compression block size for the storage data object to the size of the typical data access performed by the host application on the storage data object is responsive to the performance resulting from using the compression block size equal to the size of the typical data access performed by the host application on the data storage data object to compress host data directed to the data storage object exceeding the performance resulting from using the compression block size equal to a fraction of the size of the typical data access performed by the host application on the data storage object.

17. The apparatus of claim 16, wherein the plurality of compression block sizes further includes a default compression block size; and wherein setting the compression block size for the storage data object to the size of the typical data access performed by the host application on the storage data object is further responsive to the performance resulting from using the compression block size equal to the size of the typical data access performed by the host application on the data storage data object to compress host data directed to the data storage object exceeding the performance resulting from using the compression block size equal to the default compression block size.

18. A computer program product, comprising:

a non-transitory computer readable medium storing program code for providing data compression in a data storage system, the set of instructions, when carried out by at least one processor, causing the processor to perform a method of:

providing a storage data object operable to persistently store data for a host application executing on a remote host computer;

determining a size of a typical data access performed by the host application on the storage data object at least in part by monitoring the sizes of input/output requests received by the data storage system from the host application and directed to the storage data object to determine the size of the typical data access performed by the host application on the storage data object;

responsive to the monitoring of the input/output requests received by the data storage system from the host application and directed to the storage data object, setting a compression block size for the storage data object to a value equal to the size of the typical data access performed by the host application on the storage data object;

receiving, by the data storage system from the host application, uncompressed host data directed to the storage data object;

generating, by the data storage system, compressed host data for the storage data object by independently compressing individual blocks of the uncompressed received host data directed to the storage data object, wherein each individual block of the uncompressed received host data directed to the storage data object that is independently compressed has a size equal to the compression block size for the storage data object; and storing, by the data storage system, the compressed data for the storage data object into non-volatile physical storage allocated to the storage data object on at least one non-volatile physical storage device within the data storage system.

* * * * *